United States Patent
Moss

(10) Patent No.: US 6,892,289 B2
(45) Date of Patent: May 10, 2005

(54) METHODS AND STRUCTURE FOR USING A MEMORY MODEL FOR EFFICIENT ARBITRATION

(75) Inventor: Robert W. Moss, Longmont, CO (US)

(73) Assignee: LSI Logic Corporation, Milpitas, CA (US)

( * ) Notice: Subject to any disclaimer, the term of this patent is extended or adjusted under 35 U.S.C. 154(b) by 325 days.

(21) Appl. No.: 10/188,882

(22) Filed: Jul. 2, 2002

(65) Prior Publication Data

US 2004/0006666 A1 Jan. 8, 2004

(51) Int. Cl.[7] .............................................. G06F 12/00
(52) U.S. Cl. ............................ 711/167; 711/209; 711/5
(58) Field of Search ............................... 711/5, 167, 209

(56) References Cited

U.S. PATENT DOCUMENTS

| | | | | |
|---|---|---|---|---|
| 4,151,598 A | * | 4/1979 | Webster | 711/117 |
| 5,072,420 A | * | 12/1991 | Conley et al. | 710/57 |
| 5,761,731 A | * | 6/1998 | Van Doren et al. | 711/155 |
| 6,108,737 A | * | 8/2000 | Sharma et al. | 710/107 |
| 6,457,100 B1 | * | 9/2002 | Ignatowski et al. | 710/107 |
| 6,510,099 B1 | * | 1/2003 | Wilcox et al. | 365/230.06 |

* cited by examiner

Primary Examiner—Matthew Kim
Assistant Examiner—Hetul Patel
(74) Attorney, Agent, or Firm—Fitch, Even, Tabin & Flannery

(57) ABSTRACT

In a system having multiple master devices coupled to a shared resource, methods and structure for a state machine based memory model associated with each bank of memory to provide an arbiter with information for generating optimal sequences of memory commands to enable improved memory subsystem bandwidth utilization. The memory model corresponding to each bank of memory emulates the latencies involved with switching of active rows or pages in the corresponding bank. Signals generated by the memory model are applied to the arbiter to enable the arbiter to efficiently determine the optimal timing for generation of memory access commands corresponding to that bank.

7 Claims, 2 Drawing Sheets

METHODS AND STRUCTURE FOR USING A MEMORY MODEL FOR EFFICIENT ARBITRATION

RELATED PATENTS

This patent is related to co-pending, commonly owned U.S. patent application Ser. No. 09/991,238, entitled METHODS AND STRUCTURE FOR SEQUENCING OF ACTIVATION COMMANDS IN A HIGH-PERFORMANCE DDR SDRAM MEMORY CONTROLLER, filed Nov. 9, 2000 and hereby incorporated by reference (hereinafter referred to as the "sibling" patent application). This patent is also related to co-pending, commonly owned U.S. patent application Ser. No. 10/188,881, entitled METHODS AND STRUCTURE FOR HIDING DRAM BANK PRECHARGE AND ACTIVATE LATENCY BY ISSUING APRIORI BANK STATE TRANSITION INFORMATION, filed Jul. 2, 2000 and hereby incorporated by reference (hereinafter referred to as the "second sibling" patent application).

BACKGROUND OF THE INVENTION

1. Field of the Invention

The present invention relates to systems using high-performance memory controllers and more specifically relates to methods and structure for using a memory model to provide state information regarding presently active rows within banks of the memory in association with arbitration for a memory subsystem to improve efficiency of arbitration decisions.

2. Discussion of Related Art

In present day digital electronic systems, high performance memory subsystems are comprised of a plurality of memory chip devices each having a plurality of banks within the device. High-performance memory chip devices typically provide for burst modes of access to help optimize bandwidth utilization of the memory device by an associated master or controlling device. Generally a "burst" operation is one where a single read or write command may access a sequence of locations within the memory chip device. Multiple banks within such memory chip devices may be operated in a variety of parallel fashions to overlap processing in one bank of the memory with processing in other banks of the memory. Such features are well-known in the art to improve performance of memory subsystems.

In general, present-day high-performance memory subsystems utilize a memory controller device between the master devices intended to utilize the memory subsystem (i.e., a general purpose processor or other special-purpose processing devices) and the memory subsystem. Such a memory controller device is intended to shield the master devices from details of controlling the memory chip devices and the memory banks to achieve optimal memory subsystem performance. For example, such memory controller devices assume responsibility for controlling the memory chip devices to best utilize burst mode operations and further controlling the multiple banks of memory to permit significant overlap in processing memory operations among the plurality of banks.

It is generally known in the art that a slave device (such as a memory controller) may be multi-ported in that it has multiple ports each of which may be coupled to a bus that, in turn, has one or more master devices coupled thereto. In the context of such a multi-ported memory controller a requesting "master device" may be understood to be a bus coupled to a port of the controller rather than a particular device on that bus. "Master device" as used herein should therefore be understood to encompass both a discrete master device coupled to a memory controller as well as a bus coupled to a port of a multi-ported memory controller.

A number of current high-performance memory subsystems utilize SDRAM (synchronous dynamic random access memory) memory chip devices as well as variants of such SDRAM devices that provided double data rate operations (i.e., DDR SDRAMs). As used herein, "SDRAM" refers to both standard SDRAM memory devices and DDR SDRAM memory devices. Features of the present invention as discussed further herein below are applicable to both types of SDRAM devices as well as other memory chip devices.

As is known in the art, industry standard specifications provide for a command structure in accessing SDRAM devices. For example, JEDEC standard JESD79 provides a standardized specification for commands used in accessing DDR SDRAM devices (published by the JEDEC Solid State Technology Association in June of 2000 and available publicly at www.jedec.org). Similar command structures are defined for access to all SDRAM devices as well as other types of memory chip devices. A memory controller device responds to memory operations requested by the master device and translates the request into appropriate SDRAM commands in an appropriate sequence to store or retrieve the requested data to or from the memory chip devices. The memory controller device therefore assumes responsibility for optimal use of available bandwidth for the memory devices with regard to the commands it is processing.

Addressing a location (or sequence of locations) in a memory chip device involves selecting a column and a row (also referred to as a "page"). The standardized command structure for accessing SDRAM devices (and other memory chip devices) requires that the desired page or row of a memory device must be open or active prior to reading or writing data from or to a memory location in that page. An "activate" command is typically used to specify the page or row to be opened prior to issuance of a read or write command accessing locations within that page. Typically, the activate command also specifies which bank of a multi-bank memory subsystem contains the row or page that is to be activated. An active or open page is closed or made inactive by a "precharge" operation. A typical sequence therefore involves closing a previously open page in a bank with a precharge command, opening a next page (in that bank) to be accessed with an activate command, and then issuing appropriate read or write commands to retrieve or store the desired data from or to memory locations in the open page.

The synchronous nature of SDRAM devices generally requires that some command be present on the input signal paths of the memory chip devices at each clock pulse applied to the memory chip device. When a read or write command is issued that requests a burst of a number of sequential locations, one or more clock cycles may be applied to the memory chip device before another read or write operation is permitted. To assure that some command is applied to the input of the memory chip device, typical memory controller devices generate nop (no-operation) commands to fill the otherwise unused command sequences during burst cycles. Other sequences of commands also require application of nop commands during latency periods awaiting completion of an earlier issued command to the memory chip device. For example, there is typically a latency following issuance of an activate command before the specified page is open and ready for a read or write command. Such latency periods are typically filled with nop commands by memory controller devices.

It is a constant problem to improve memory bandwidth utilization to thereby improve overall system performance for an associated system. Methods and structures that improve memory subsystem bandwidth utilization are therefore desirable. In particular, it is desirable to reduce the latency between activation of a page of memory and access to the opened page.

The sibling patent application teaches structures and methods for sequencing the commands applied by the memory controller to the memory subsystem banks to reduce latency and thereby improve system performance. Such a memory controller requires the master devices to indicate the need for a bank activation in advance of the actual need to utilize the bank. This information is required by the memory controller to enable it to detect appropriate command cycles in which SDRAM commands may be inserted to sequence the commands to improve the memory subsystem utilization. The second sibling patent application teaches structures and methods for enabling multiple master devices coupled to an improved arbiter to generate such information (apriori information) identifying the need for a bank in advance of the actual transfer of information to or from that bank. Such an improved arbiter may generate the apriori information from a number of possible sources of information.

It is evident from the above discussion that it remains a problem for an arbiter to efficiently make determinations as to which master devices are best suited for next receiving a grant of the shared resource to optimize utilization of the shared resource. In particular, it remains a problem for an arbiter to efficiently determine which of a plurality of master devices requesting access to a shared memory subsystem through a memory controller would best utilize the available memory subsystem bandwidth in view of various latency considerations in the control of the memory subsystem.

SUMMARY OF THE INVENTION

The present invention solves the above and other problems, thereby advancing the state of useful arts, by providing methods and structure for an arbiter to utilize a memory model providing state information to efficiently determine which master device presently requesting access to a shared memory subsystem would best utilize the bandwidth of the shared memory subsystem. More generally, a state machine model within the arbiter utilizes saved information regarding transactions with the shared resource to improve the decision making process of the arbiter to best utilize the shared resource.

More specifically, one exemplary preferred embodiment of the present invention provides that a state machine with an associated state memory is provided for each of multiple regions (i.e., banks) of the memory subsystem memory array. Memory request transaction information generated by master devices is further decoded into a portion of memory within a region that will be activated and a range within that activated portion that will be accessed by the master device request. A state machine memory model is associated with each region (i.e., bank) of memory and determines from the further decoded information when the request should be optimally processed. Signals generated by the state machine associated with each region of memory are then applied to the improved arbiter to enable the arbiter to efficiently make decisions as to the optimal sequence of transactions to be processed by the shared memory controller to improve overall system performance.

A first feature of the invention therefore provides a circuit in a system including a plurality of banks of memory coupled to a plurality of master devices through a shared memory controller such that each bank of memory has multiple row addresses associated therewith and such that an arbiter is associated with the memory controller to control access by the plurality of master devices to the multiple banks of memory, the circuit being associated with the arbiter to provide information to the arbiter for selection of a master device memory request to be forwarded through the memory controller to the multiple banks of memory, the circuit comprising: a memory element for storing indicia of a first row within a corresponding bank of the multiple banks of memory; and a latency estimator coupled to the memory element for estimating latency period of the corresponding bank when a memory request accesses a second row in the corresponding bank and for generating a signal applied to the arbiter indicating readiness of the corresponding bank.

Another aspect of the invention further provides a decoder for decoding memory requests from the master devices.

Another aspect of the invention further provides that the decoder includes a row address decoder for identifying the row within the bank to which a memory request is directed.

Another aspect of the invention further provides that the latency estimator includes a counter for counting an estimated latency period after a memory request is received that is directed to a row address different than the first row.

A second feature of the invention provides a system comprising: multiple master devices that generate memory requests; multiple banks of memory where each bank includes multiple rows of memory locations; a memory controller coupled to the multiple banks of memory for controlling access to the multiple banks of memory; an arbiter associated with the memory controller and coupled to the multiple master devices for arbitrating among the master devices to apply the memory requests generated by the master devices to the memory controller; and a plurality of memory model circuits associated with the arbiter for generating signals applied to the arbiter such that each memory model is associated with a corresponding bank of the multiple banks of memory and such that the signals indicate readiness of the corresponding bank for application of a memory request generated by a master device.

Another aspect of the invention further provides that each memory model circuit includes: a memory element for storing a last address generated by a master device of the multiple master devices; and a comparator for comparing a previously stored last address with a new address corresponding to a memory request generated by a master device of the multiple master devices such that the comparator is operable to determine whether the new address is within the same region of memory as the last address and is further operable to generate an output signal indicating that the new address is within the same region of memory as the last address.

Another aspect of the invention further provides that the new address is applied as an input to the memory element and such that memory model further includes: a new command signal generator coupled to the memory element for generating a new command signal output when a new command is generated by a master device of the multiple master devices for application to the memory controller such that the new command signal output is applied to the memory element to enable the memory element to store the new address.

Another aspect of the invention further provides that the memory model further includes: a state machine coupled to the new command signal generator and coupled to the comparator for generating a signal indicating readiness of the corresponding bank for processing of the memory request corresponding to the new address.

Another aspect of the invention further provides that the state machine includes: a latency estimator circuit for estimating the latency period required for the corresponding bank to be ready to process the memory request corresponding to the new address.

Another aspect of the invention further provides that the latency estimator circuit includes: a counter for counting a period of time corresponding to a latency period of the corresponding bank before the corresponding bank is ready to accept the memory request corresponding to the new address and such that the signal generated by the state machine indicates that the counter has reached a predetermined terminal count.

Another feature of the invention provides a method in a system having an arbiter coupling a plurality of master devices to a shared memory controller, the method comprising: providing a memory model element associated with the arbiter for modeling the behavior of an associated bank of memory coupled to the memory controller; and arbitrating among requests from the plurality of master devices in accordance with signals generated by memory model.

Another aspect of the invention further provides that the step of applying comprises the step of: simulating readiness of the associated bank of memory corresponding to the memory model.

Another aspect of the invention further provides that the step of simulating comprises the step of: estimating page activation latency of the associated bank of memory.

Another aspect of the invention further provides that the step of arbitrating includes the step of: deferring granting of access to the shared memory controller by a requesting master device of the plurality of master devices until a requested page is estimated to be active in response to the step of estimating.

DETAILED DESCRIPTION OF THE PREFERRED EMBODIMENTS

Figure 1:
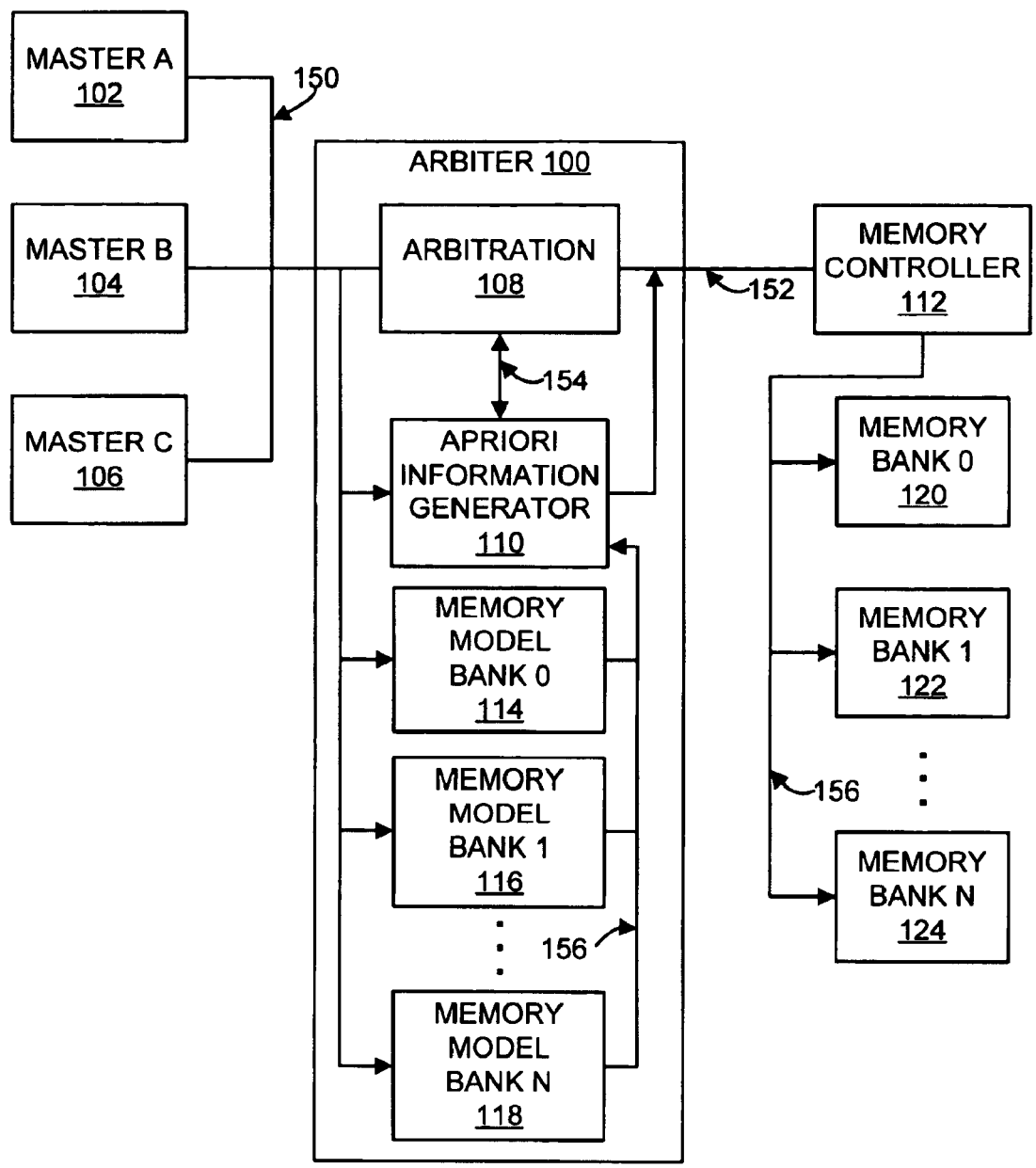
FIG. 1 is a block diagram of a system with an improved arbiter using models of memory banks to improve decisions in processing memory requests to improve memory bandwidth utilization.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a system with an improved arbiter 100 using memory models 114 through 118 to aid in generating apriori information 110 for use by a shared resource 112 to improve utilization of the shared resource. In general, arbiter 100 receives requests for access to the shared resource 112 from any of multiple master devices 102, 104 or 106. Requests for such access and grant signals associated with such requests are exchanged via path 150 between arbiter 100 and master devices 102, 104 and 106. Arbiter 100 includes standard arbitration element 108 to select among requesting master devices 102 through 106 to grant requested temporary exclusive access to the shared resource 112. Arbitration element 108 applies well-known, standard arbitration techniques to select among the plurality of master devices including, for example, round-robin and priority-based arbitration techniques.

Those of ordinary skill in the art will readily recognize that master devices 102 through 106 may be any of several common types of master devices coupled to common interface bus path 150. For example, master devices 102 through 106 may be general or special purpose processors, intelligent I/O coprocessors, DMA coprocessors and other devices capable of initiating requests for interaction with the shared resource 112. Similarly, those of ordinary skill in the art will readily recognize that shared resource 112 represents a wide variety of components shared by the master devices. For example, shared resource 112 may simply be a common interface bus shared by the multiple master devices.

In an exemplary preferred embodiment, where master devices 102 through 106 communicate with a memory subsystem, shared resource 112 preferably represents a memory controller of the shared memory subsystem. In particular, memory controller 112 preferably controls multiple banks of memory 120 through 124 such that each bank is activated as a request is directed thereto and deactivated as required. More specifically, a particular page or row in a desired bank is activated in preparation for processing a memory request from a master device. Master devices 102 through 106 therefore represent general or special purpose processors, DMA controllers and intelligent I/O peripheral controllers that require access to one or more banks of the multiple banks of memory controlled by the shared memory controller.

In this preferred embodiment, as noted above and in the second sibling patent application, it is advantageous for the shared memory controller 112 to receive apriori information indicative of upcoming changes in the active bank of memory controlled by the memory controller. Apriori information generator 110 monitors request and grant information applied to path 150 and exchanges information with arbitration element 108 via path 154 to generate such apriori information. In particular, apriori information generator 110 is used in conjunction with arbiter 108 to generate memory bank precharge and activate commands for application to bus 152 in conjunction with memory request commands generated by master devices 102 through 106 and applied to path 152 through arbitration element 108 and path 150.

Still further, in accordance with the present invention, arbiter 100 can improve the efficiency with which it determines the optimal ordering of memory requests and hence generation of desired apriori information, by providing memory models 114 through 118 within the arbiter. Memory models 114 through 118 provide a model of the behavior of a corresponding bank of memory 120 through 124, respectively. The model preferably generates signals indicative of the readiness of the corresponding memory bank for processing of a memory request. Using such signals, arbiter 100 and specifically apriori information generator 110 may efficiently make determinations as to the optimal ordering of application of master device generated memory requests to the memory controller so as to permit optimal overlap of precharge/activate latency periods with other memory request processing. Such overlap of memory request processing improves the utilization of the memory subsystem and hence improves overall system performance.

Those of ordinary skill in the art will readily recognize that these features of the present invention may be advantageously applied to a number of system and bus architectures. For example, the devices and buses depicted in FIG. 1 may be compliant with the AMBA AHB standards as well as other well-known commercial bus architectures such as PCI. Generally, the features of the present invention are advantageously applied where a shared resource coupled to multiple master devices would benefit from apriori information regarding future bus transactions to permit optimization of utilization of the shared resource. The exemplary preferred embodiment wherein the shared resource is a memory controller is therefore intended as one common example of such a beneficial application. Still further, those skilled in the art will recognize that the various elements may be organized into a variety of logical groupings. In other words, the memory models 114 through 118 may be physically, tightly integrated within the arbiter as shown in FIG. 1 or may be physically integrated with other elements. In like manner, arbiter 100 may be a distinct component with respect to the memory controller 112 or may integrated as an element within the memory controller. Such design choices are well known to those of ordinary skill in the art.

Figure 2:
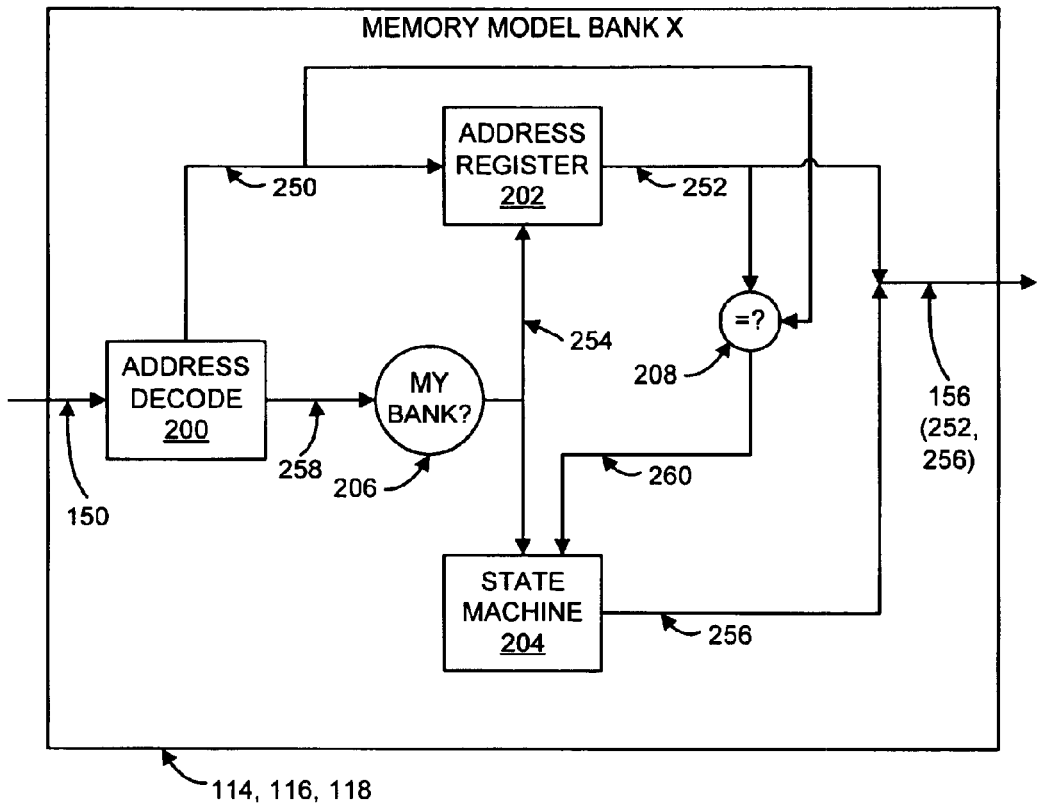
FIG. 2 is a block diagram providing additional details of the structure of an exemplary memory model for one exemplary memory bank.

FIG. 2 is a block diagram of the structure of a single memory model (114, 116 or 118 of FIG. 1) that provides signals to the arbiter to improve efficiency in the arbiter's decision-making process for optimal sequencing of memory requests generated by master devices. Memory requests from the various master devices are applied to the memory model via path 150. Address decode element 200 receives the memory requests and decodes address information within the newly received memory requests. In general, address decode element 200 divides the memory request addresses into portions that identify a particular bank of memory and a particular row or page within that bank. A first signal 258 generated by address decode element 200 represents a portion of the received memory address indicating the desired memory bank for the memory request. The bank portion of the address of the memory request applied via path 258 to comparator 206 to compare the bank address against the predetermined bank address for the memory bank corresponding to the particular memory model. If the decoded memory bank address matches the predetermined bank information corresponding to that bank of the memory model, element 206 generates a new command signal applied to path 254 to enable further processing within that bank of the memory model. Memory requests directed to other bank addresses (other than the predetermined bank address corresponding to that particular memory model) are thereby ignored within those other memory model elements of the system.

Address decode element 200 preferably generates a second signal applied via path 250 to address register 202 and comparator 208. The signal applied to path 250 is a decoded row address from memory requests applied to path 150. The row address portion of the memory address of a received memory request indicates the particular row or page within a bank for which the memory request desires a transfer of data.

Upon the recognition of a new command directed to the corresponding bank of the memory model, comparator 206 applies a signal to path 254 to register the newly received and decoded row address portion in address register 202. The output signal from address register 202 is the current registered row address. The current registered row address is applied as an output signal to path 252 and thereby as an input to comparator 208. Comparator 208 therefore compares the presently registered row address with the newly received row address from a new memory request received on path 150. An output signal generated by comparator 208 indicating whether the currently registered row address is equal to the newly decoded row address is applied to path 260 as an input to state machine 204.

The presently registered row address is applied as an output of address register 202 to path 252 and applied, in turn to path 156 to other elements of the system as depicted in FIG. 1. In particular, the arbiter of FIG. 1 preferably utilizes the presently registered row address from each memory model corresponding to each bank to generate appropriate precharge and activate commands for the associated memory bank.

State machine 204 receives the output of comparator 208 via path 260 and also receives the new command signal on path 254 indicating receipt of a memory transaction directed to the memory bank corresponding to the particular memory model. State machine 204 models the operation of the corresponding bank to indicate whether the corresponding bank is presently active (ready to process a memory request) or inactive (not presently ready to process a memory request due to latency in opening the desired row or page). An output signal applied to path 256 indicates whether the modeled memory bank is presently active or inactive in accordance with the operation of state machine 204. The active or inactive state of the model the memory bank applied to path 256 and applied, in turn, via path 156 to other elements within the system as shown in FIG. 1. In particular the active or inactive status of each modeled memory bank is provided to the arbiter within the system to improve efficiency of its decision-making processes in applying memory requests from the various master devices to the shared memory controller.

In FIG. 2, paths 252 and 256 may be viewed as forming, in combination, path 156. The diagram of FIG. 2 is not intended to indicate a specific electrical connection between the signal paths 252, 256 and 156 but rather a logical combination of a variety of signals that make up portions of the signal path labeled 156.

Figure 3:
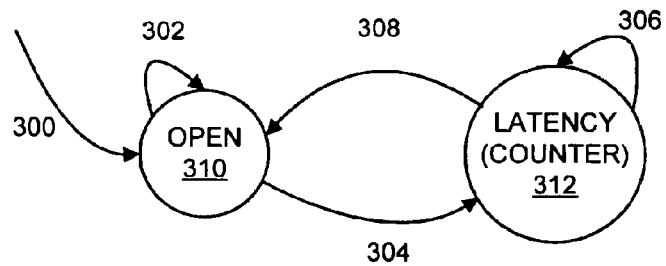
FIG. 3 is a state transition diagram describing operation of an exemplary state machine within the exemplary memory model of FIG. 2.

FIG. 3 is a diagram of the operation of state machine 204. The state machine 204 is preferably operable to have at least two states: open state 310 and latency state 312. These two states stimulate or model the overall operation of the corresponding bank of memory such that the bank is presently active (open state 310) with respect to a particular row or page address or the modeled memory bank is presently inactive (latency state 312) and therefore either idle or in the process of opening a requested page or row. While a requested page or row is in the process of being opened or activated, state machine 204 remains generally in latency state 312 until the expected latency period for activating or opening a requested row or page expires. In one exemplary preferred embodiment, latency state 312 is operable to count a number of clock periods corresponding to the specified latency of a bank of memory in opening a newly requested page or row. Such a ubiquitous clock signal is not shown in the figures but is well-known to those of ordinary skill in the art.

Operation of state machine 204 is best understood with reference to the conditions that cause state transitions (300 through 308 of FIG. 3) and the output signals generated in each state. The state transition reference numbers (300 through 308) correspond to the following conditions:

| State Reference Number | Condition Description |
|---|---|
| 300 | Power on reset or other initialization conditions |
| 302 | No new command (254) for this bank received OR Decoded row address (250) is equal to modeled row address (252) |
| 304 | A new command (254) for this bank is received AND Decoded row address (250) is not equal to modeled row address (252) |
| 306 | Latency period counter is not expired OR (A new command (254) for this bank is received AND Decoded row address (250) is not equal to modeled row address (252)) |
| 308 | Latency period counter is expired AND NOT (A new command (254) for this bank is received AND Decoded row address (250) is not equal to modeled row address (252)) |

While in each state (310 and 312) certain signals are generated for continued operation of the model and for application to the arbiter for processing decisions regarding when to optimally apply memory requests to a bank of memory. The output signals generated in each state are as follows:

| State | Generated Signals |
|---|---|
| 310 (OPEN) | 1) Modeled bank is active (256)<br>2) Reload latency period counter when a new command (254) for this bank is received AND Decoded row address (250) is not equal to modeled row address (252) |
| 312 (LATENCY) | 1) Modeled bank is inactive (256)<br>2) Decrement latency period counter<br>3) Reload latency period counter when a new command (254) for this bank is received AND Decoded row address (250) is not equal to modeled row address (252) |

Operation of the state machine can also be understood by reading of the following pseudo-code method that may be implemented by any suitable designed circuit or suitably programmed processor.

```
Procedure SM( ) {
    state = OPEN
    at each CLK pulse
    {
        case (state) {
        OPEN:
            Assert Modeled Bank Active
            if (New Command Received for My Bank &&
                Decoded Row of New Command != Modeled Row)
            {
                latency counter = LATENCY PERIOD
                state = LATENCY
            }
        LATENCY:
            Assert Modeled Bank InActive
            latency counter = latency counter − 1
            if (New Command Received for My Bank &&
                Decoded Row of New Command != Modeled Row)
            {
                latency counter = LATENCY PERIOD
            }
            else if (latency counter == 0)
            {
                state = OPEN
            }
        }
    }
}
```

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A system comprising:
   multiple master devices that generate memory requests;
   multiple banks of memory where each bank includes multiple rows of memory locations;
   a memory controller coupled to said multiple banks of memory for controlling access to said multiple banks of memory;
   an arbiter associated with said memory controller and coupled to said multiple master devices for arbitrating among said master devices to apply said memory requests generated by said master devices to said memory controller; and
   a plurality of memory model circuits associated with said arbiter for generating signals applied to said arbiter wherein each memory model is associated with a corresponding bank of said multiple banks of memory and wherein said signals indicate readiness of said corresponding bank for application of a memory request generated by a master device,
   wherein said arbiter is adapted to arbitrate among said master devices in accordance with said signals generated by said plurality of memory model circuits,
   wherein each memory model circuit includes:
   a memory element for storing a last address generated by a master device of said multiple master devices; and
   a comparator for comparing a previously stored last address with a new address corresponding to a memory request generated by a master device of said multiple master devices wherein said comparator is operable to determine whether said new address is within the same region of memory as said last address and is further operable to generate an output signal indicating that said new address is within the same region of memory as said last address.

2. The system of claim 1 wherein said new address is applied as an input to said memory element and wherein memory model further includes:
   a new command signal generator coupled to said memory element for generating a new command signal output when a new command is generated by a master device of said multiple master devices for application to said memory controller wherein said new command signal output is applied to said memory element to enable said memory element to store said new address.

3. The system of claim 2 further wherein said memory model further includes:

a state machine coupled to said new command signal generator and coupled to said comparator for generating a signal indicating readiness of the corresponding bank for processing of the memory request corresponding to said new address.

4. The system of claim 3 wherein said state machine includes:

a latency estimator circuit for estimating the latency period required for the corresponding bank to be ready to process said memory request corresponding to said new address.

5. The system of claim 4 wherein said latency estimator circuit includes:

a counter for counting a period of time corresponding to a latency period of said corresponding bank before said corresponding bank is ready to accept said memory request corresponding to said new address and wherein said signal generated by said state machine indicates that said counter has reached a predetermined terminal count.

6. The system of claim 1 wherein said memory controller is a multi-ported memory controller and wherein each master device of said plurality of master devices is a bus coupled through said arbiter to a corresponding port of said multi-ported memory controller.

7. In a system having an arbiter coupling a plurality of master devices to a shared memory controller, a method comprising:

providing a memory model element associated with said arbiter for modeling the behavior of an associated bank of memory coupled to said memory controller;

arbitrating among requests from said plurality of master devices in accordance with signals generated by said memory model; and applying a signal from said memory model to the arbitrator simulating readiness of the associated bank of memory corresponding to said memory model wherein the simulating comprises estimating page activation latency of the associated bank of memory, wherein the step of arbitrating includes the step of:

deferring granting of access to said shared memory controller by a requesting master device of said plurality of master devices until a requested page is estimated to be active in response to the step of estimating.

* * * * *